United States Patent
Moss et al.

(10) Patent No.: US 11,210,406 B2
(45) Date of Patent: Dec. 28, 2021

(54) ENCRYPTING SYSTEM LEVEL DATA STRUCTURES

(71) Applicant: SEAGATE TECHNOLOGY LLC, Cupertino, CA (US)

(72) Inventors: Robert W. Moss, Windsor, CO (US); Stacey Secatch, Longmont, CO (US); Kristofer C. Conklin, Burnsville, MN (US); Dana L. Simonson, Owatonna, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 625 days.

(21) Appl. No.: 15/212,022

(22) Filed: Jul. 15, 2016

(65) Prior Publication Data
US 2018/0018469 A1    Jan. 18, 2018

(51) Int. Cl.
| | |
|---|---|
| *G06F 21/60* | (2013.01) |
| *G06F 21/62* | (2013.01) |
| *G06F 21/72* | (2013.01) |
| *H04L 9/14* | (2006.01) |
| *G06F 3/06* | (2006.01) |
| *H04L 29/06* | (2006.01) |

(52) U.S. Cl.
CPC ........ *G06F 21/602* (2013.01); *G06F 21/6227* (2013.01); *G06F 21/72* (2013.01); *H04L 9/14* (2013.01); *G06F 3/0623* (2013.01); *G06F 21/60* (2013.01); *H04L 63/0428* (2013.01)

(58) Field of Classification Search
CPC .... G06F 21/602; G06F 3/0607; G06F 21/554; G06F 21/6209; G06F 21/50; G06F 21/72; H04L 67/2828; H04L 9/14; H04N 5/913

USPC .......................................................... 713/189
See application file for complete search history.

(56) References Cited

U.S. PATENT DOCUMENTS

| | | | |
|---|---|---|---|
| 8,130,959 B2* | 3/2012 | Goodman | H04L 9/083 380/273 |
| 8,687,814 B2* | 4/2014 | Nord | G06F 21/602 380/278 |
| 8,812,877 B2 | 8/2014 | Mori et al. | |

(Continued)

FOREIGN PATENT DOCUMENTS

| CN | 103699855 A | 4/2014 |
|---|---|---|
| CN | 104246789 A | 12/2014 |

OTHER PUBLICATIONS

Communication from European Patent Office reporting Extended European Search Report, Application No. EP 17181307.4, dated Oct. 10, 2017, seven (7) pages.

*Primary Examiner* — Bryan F Wright
(74) *Attorney, Agent, or Firm* — Hall Estill Law Firm

(57) ABSTRACT

Systems and methods for encrypting system level data structures are described. A storage system may include a storage drive and at least one controller for the storage drive. In some embodiments, the at least one controller may be configured to identify user data assigned to be stored on the storage drive, encrypt the user data, identify a system data structure generated in relation to the user data, and encrypt the system data structure. In some cases, the data structure may include at least one of metadata, system data, and data encapsulation relative to the user data. In some embodiments, the user data and the data structure may be encrypted with one or more encryption keys programmed on the storage drive.

18 Claims, 7 Drawing Sheets

(56) References Cited

U.S. PATENT DOCUMENTS

| | | | |
|---|---|---|---|
| 2004/0255080 A1* | 12/2004 | Kihara | G06F 3/0607 711/114 |
| 2005/0069132 A1* | 3/2005 | Sakai | H04N 5/913 380/239 |
| 2007/0011469 A1* | 1/2007 | Allison | G06F 21/6209 713/193 |
| 2007/0180239 A1* | 8/2007 | Fujibayashi | G06F 11/1076 713/165 |
| 2008/0273697 A1* | 11/2008 | Greco | G11B 20/00086 380/44 |
| 2009/0190760 A1 | 7/2009 | Bojinov et al. | |
| 2009/0228700 A1* | 9/2009 | Hubbell | G06F 11/1004 713/153 |
| 2009/0319773 A1* | 12/2009 | Frenkel | G06F 21/50 713/153 |
| 2010/0153701 A1* | 6/2010 | Shenoy | H04L 12/4633 713/151 |
| 2010/0199042 A1 | 8/2010 | Bates et al. | |
| 2013/0227303 A1* | 8/2013 | Kadatch | G06F 21/554 713/193 |
| 2013/0291089 A1* | 10/2013 | Wang | H04L 67/2828 726/14 |
| 2014/0189363 A1 | 7/2014 | Thomas et al. | |
| 2015/0363611 A1 | 12/2015 | Redberg | |
| 2018/0024942 A1* | 1/2018 | Canepa | H04L 9/0838 713/193 |

\* cited by examiner

ENCRYPTING SYSTEM LEVEL DATA STRUCTURES

SUMMARY

The present disclosure is directed to methods and systems for encrypting system level data structures. In some embodiments, encrypting system level data structures may improve data security by limiting secondary data leakage. In some cases, the present disclosure may describe systems and methods for payload header encryption resulting in a reduction in system power consumption and area used by electronic components.

A storage system for encrypting system level data structures is described. In one embodiment, the storage system may include a storage drive and a controller of the storage drive. In some embodiments, the controller may be configured to identify user data assigned to be stored on the storage drive, encrypt the user data, identify a system data structure generated in relation to the user data, and encrypt the system data structure. In some cases, the data structure may include at least one of metadata, system data, and data encapsulation relative to the user data. In some embodiments, the user data and the data structure may be encrypted with one or more encryption keys programmed on the storage drive.

In one embodiment, the controller may be configured to generate a packet to encapsulate the user data. The packet may include a number of areas, which may include a payload area and/or a header area. In some embodiments, the controller may be configured to put the encrypted user data in a payload area of the packet.

In one embodiment, the controller may be configured to identify header data associated with at least one of the user data and the packet. In some embodiments, the controller may be configured to encrypt the header data with an encryption key used to encrypt the user data. Alternatively, the controller may encrypt the header data using a different encryption key than the one used to encrypt the user data. In some embodiments, the controller may be configured to put the encrypted header data in a header area of the packet.

In some embodiments, the controller may be configured to generate metadata in relation to the user data. In some cases, the metadata may include data that describes the user data. In one embodiment, the metadata may be generated by the storage drive and/or a user of the storage drive. In some embodiments, the controller may be configured to encrypt the metadata with an encryption key used to encrypt the user data. Alternatively, the controller may encrypt the metadata using a different encryption key than the one used to encrypt the user data.

In some embodiments, the controller may be configured to generate system data in relation to the user data. In some cases, the system data may include data to enable the storage drive to perform an operation involving the user data. In one configuration, the system data may be generated by the storage drive. In some embodiments, the controller may be configured to encrypt the system data with an encryption key used to encrypt the user data. Alternatively, the controller may encrypt the system data using a different encryption key than the one used to encrypt the user data.

An apparatus for encrypting system level data structures is also described. In one embodiment, the apparatus may include a processor, memory in electronic communication with the processor, and instructions stored in the memory, the instructions being executable by the processor to perform the steps of generating a packet to encapsulate the user data, putting the encrypted user data in a payload area of the packet, identifying header data associated with at least one of the user data and the packet, encrypting the header data with an encryption key used to encrypt the user data, and putting the encrypted header data in a header area of the packet.

A method for encrypting system level data structures is also described. In one embodiment, the method may include generating a packet to encapsulate the user data, putting the encrypted user data in a payload area of the packet, identifying header data associated with at least one of the user data and the packet, encrypting the header data with an encryption key used to encrypt the user data, and putting the encrypted header data in a header area of the packet.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
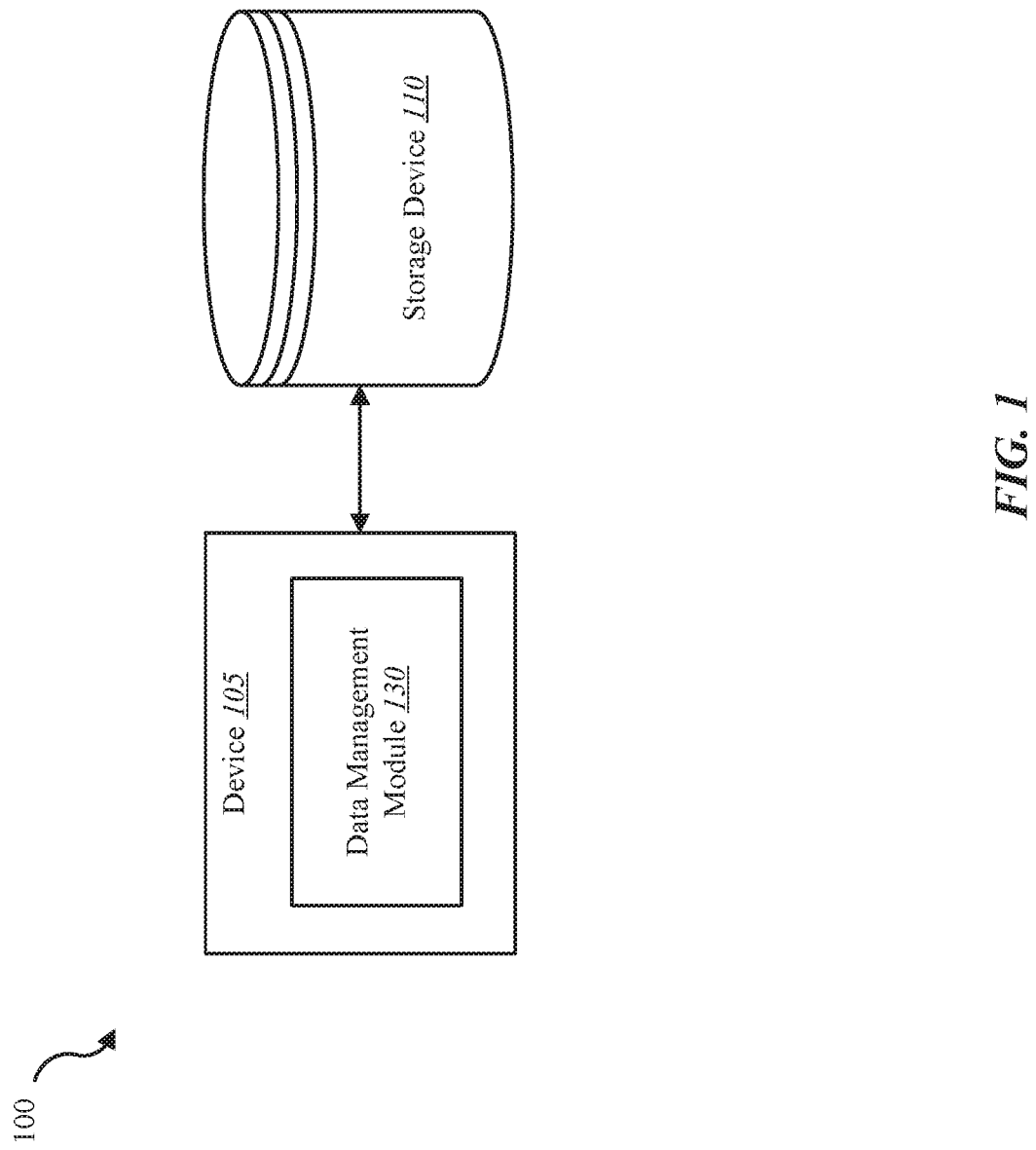
FIG. 1 is a block diagram of an example of a system in accordance with various embodiments.

The following relates generally to encrypting system level data structures to prevent data leakage and improve power consumption and electronic component area usage.

In some embodiments, data may be stored based on a packet-based layered protocol. The packet-based layered protocol may include a transaction layer, a data link layer, and a physical layer. The transaction layer may handle packetizing and de-packetizing of data. The data link layer may sequence these transaction layer packets and ensure the packets are reliably delivered to an endpoint or storage location. The physical layer may include logic gates for processing packets before transmission and include differential drivers and receivers for physical communication of packets. A packet may include a header and data payload. The transaction layer may assemble this section based on the data received from the application software layer. An optional end-to-end cyclic redundancy check (ECRC) field may be appended to the packet to check for errors inside header and data payload sections. A sequence identifier may be appended and local CRC (LCRC) field to protect the sequence identifier. The resulting packet may be forwarded to the physical layer which concatenates start and end framing characters of 1 byte each to the front and end of the packet, respectively. The packet may then be encoded and differentially transmitted to permanent storage.

The header of a packet may include any combination of a medium specific header field, a header version field, a reserved space field, a destination endpoint identifier, a source endpoint identifier, a message tag, a packet sequence number, an end of message field, a start of message field. In some embodiments, two or more packets may be combined into a message. Like a packet, the message may include a payload area for the user data and a header. The header of the message may include any combination of a reserved space field, a response or request field indicating whether the message is a response or a request, a message type field, a command slot identifier field, and an integrity check field.

A problem with current solutions involves data leakage via system data, metadata, and any data that provides information about user data. As one example, some data may be compressed. By knowing the compression ratio one may infer information about the compressed data. Current solutions may encrypt user data, put the encrypted data in a packet, and then encrypt the packet of encrypted data, resulting in at least part of the data being encrypted twice, which results in the data being decrypted twice in order to read the user data.

Malicious software or malware may execute on a storage system. For example, malware may infect the drive firmware and/or infect an application stored on the storage drive. The malware may access the header data. The data in the header may reveal information about the encrypted user data such as data type, data size, compression ratios associated with the user data, whether the data is compressed at a relatively high compression ratio or relatively low compression ratio, or any combination thereof. In one embodiment of the present disclosure, the systems and methods provide an encryption solution that results in reduced power.

For example, a storage system may use more power to encrypt an entire packet than to encrypt header data and user data before adding them to the packet. Similarly, encrypting the header and user data before adding them to a packet may take less encryption engines and/or not as large of an encryption engine to perform the encryption of an entire packet. An encryption engine may include any combination of processors, storage controllers, application specific integrated circuits (ASICs), field programmable gate arrays (FPGAs), and systems on chip (SoCs). Thus, a reduction in the encryption engine of a storage system may include a reduction in the size and/or number of processors, controllers, ASICs, FPGAs, SoCs, or any combination thereof, on the storage system. As one example, a conventional system configured to encrypt an entire packet may use at least 20 encryption engines to encrypt the entire packet, whereas the presently disclosed systems and methods may take 10 or less encryption engines to encrypt the header and user data separately resulting in reduced power and chip area consumption.

In one embodiment, the user data may be added to a packet and/or a message that includes a header. In some embodiments, the user data may be encrypted in a first encryption operation and the data of the header may be encrypted in a second encryption operation separate and different from the first encryption operation. In some configurations, the encrypted user data may be added to a payload area of the packet and the encrypted header data may be added to the header of the packet or the header of the message. In some embodiments, one encryption engine may be used for all data channels. Alternatively, each data channel may include an encryption engine dedicated to encrypt user data and/or headers associated with a particular data channel of the storage drive.

System data structures may include any combination of system data and metadata. System data and metadata may be dynamically created and used while a storage system is operating. In some cases, incremental snapshots or complete copies of the system data structures may be stored to a non-volatile storage media. For example, log files may be saved once an hour, journals saved once the log files reach a certain size, and error rates and/or information regarding errors may be saved on a regular basis and/or as errors occur. By encrypting all data using a storage system encryption key, the secondary leakage may be prevented.

System data and metadata may include information regarding a location where user data is stored in a storage system, logical block address (LBA) information, mapping information, a type of encryption used to encrypt the user data, a frequency of locations being written to, when data is written, an order data is written in, a size of data, whether there is compression in the user data, a compression ratio of the user data, or any combination thereof.

In one embodiment, system data may include data that the storage system generates in relation to an operation of the storage system. In some embodiments, system data may describe data to the storage system while metadata describes data to a user of the storage system. In some cases, system data may include data used by the storage system to describe and/or perform one or more operations. For example, system data may include internal data frames, diagnostic information, data leakage logs, data counters, state of the memory/storage, available storage space, or any combination thereof. In some embodiments, system data may describe the drive behavior such as a log file that lists operations performed by the storage device and/or operations scheduled to be performed by the storage device. System data may include any data generated by a computing system. In some cases, system data may include data generated as a result of user data being created, written, read, modified, etc. In some configurations, system data may include data generated by a storage system and used by the storage system to perform one or more functions provided by the storage system. In some embodiments, system data may be hidden from a user of the storage system and only accessed by the storage system, whereas metadata, generated by the storage system and/or a user of the storage system, may be viewable by both the storage system and a user of the storage system.

In some embodiments, metadata may describe data to a user of a storage system. As one example, metadata may include filename, file size, read/write/modify attributes, and other similar attributes of user data to a user of the storage system, while system data may describe where a file is physically located on the storage system, a mapping between a virtual location of the data from the perspective of a host of the storage system and the physical location where the user data is physically stored, an age value of the user data, access frequency of the user data, or any combination thereof. For example, a web page may include metadata specifying what language the page is written in, what tools were used to create it, and where to find more information about the subject. Metadata also helps organize electronic resources, provide digital identification, and helps support archiving and preservation of the resource. Metadata assists in resource discovery by allowing resources such as communication, processing, memory, and/or storage resources to be found by relevant criteria, identifying resources, bringing similar resources together, distinguishing dissimilar resources, and providing resource location information.

Metadata may be defined as the data providing information about one or more aspects of user data. Metadata may be used to summarize basic information about data to simplify tracking and working with specific data. Some examples include means of creation of the data, purpose of the data, time and date of creation, creator or author of the data, location on a device and/or computer network where the data is created, standards used in relation to the data, and file size. As an example, a digital image may include metadata that describes how large the picture is, the color depth, the image resolution, when the image was created, and other related data. A text document's metadata may contain information about how long the document is, character count, word count, page count, who the author is, when the document was written, and a short summary of the document. Metadata within web pages may contain descriptions of page content as well as key words linked to the content. Web pages may include metadata in the form of meta tags. Description and keywords in meta tags may be used to describe the Web page's content. Meta elements also specify page description, key words, authors of the document, and when the document was last modified. Information on the times, origins and destinations of phone calls, electronic messages, instant messages and other modes of telecommunication, as opposed to message content, may be another form of metadata. Metadata may be used with video, where information about video content such as transcripts of conversations and text descriptions of a scene. Metadata may be used in data virtualization servers or enterprise infrastructure components, alongside database and application servers. Metadata may be stored either internally, in the same file or structure as the data (embedded metadata), or externally in a separate file or field from the described data. A data repository may store the metadata detached from the data, but may be designed to support embedded metadata approaches. Metadata may be stored in either human-readable or binary form.

Data on a non-volatile memory storage drive such as a flash memory storage drive may be garbage collected and so rewritten to one or more locations on the storage drive. Accordingly, multiple copies of the data may exist on the storage drive. Metadata associated with this data may enable malware to locate the one or more copies of the data including stale data. As one example, a document may be created and stored at a first location of a storage drive. Subsequently, the document may be edited. The edited document may be stored at a second location. Again, the document may be edited and this version of the document may be stored at a third location. Metadata associated with the document may enable malware to locate each version of the document and detect changes on the document based on information provided by the metadata of each version of the document at the first, second, and third locations.

In storage systems where the user data is encrypted, information about the user data may be leaked through the data structures used to manage the user data such as mapping tables, data location, stale copies of data, compressed data sizes, etc. The present systems and methods may prevent this sort of data leakage by ensuring that the system data and metadata that could potentially leak this secondary information is encrypted with a drive encryption key prior to committing the data to permanent storage.

The present systems and methods reduce data leakage by encrypting system data structures. In some embodiments, the systems and methods include encrypting payload header information. In some cases, encrypting system data may result in reducing power consumption by the storage system and/or reducing the physical area used for encryption on the storage system. A conventional system may be configured to encrypt an entire data packet even if at least some of the data added to the packet is already encrypted. For example, after adding to the packet all the data meant for the packet, the conventional system may encrypt the entire data packet. Conversely, the present systems and methods may be configured to encrypt user data and at least a portion of other data meant for the packet before adding them to the packet while leaving the entire packet unencrypted. Encrypting the entire data packet may use more encryption chip space and consume more system power compared to encrypting the data before adding the data to the packet and then bypassing encryption of the entire packet.

In some embodiments, user data may be packetized on a storage system and stored on a storage medium of the storage system in packetized form. In one configuration, the packet may include a header. In some cases, the header may leak information about the data contained in that packet even when the data itself is encrypted. One solution to prevent access to this header information has been to encrypt the entire packet that contains both the user data and the header. However, encrypting an entire packet requires more encryption bandwidth than encrypting the individual parts of the packet. For example, one part of the packet may include user data, another part header data, etc., and encrypting the entire packet with all of its parts takes more encryption bandwidth than encrypting the individual parts and adding them to the packet. In one embodiment of the present disclosure, the encryption bandwidth describes a number of encryption processors used to encrypt data, the chip space and/or area of a printed circuit board consumed by the given number of encryption processors, and the power consumed by the encryption processors. Accordingly, in some embodiments, the present systems and methods may select at least a portion of packetized data, or data designated to be added to a packet, and encrypt at least this portion. In some cases, the present systems and methods may use a drive specific encryption key to encrypt this data. In some cases, the encryption bandwidth of the present systems and methods may be based at least in part on the amount of header overhead for a given packet. For example, an 8-byte header in a 2048-byte packet uses only 4% the bandwidth of the encryption required to encrypt the entire packet.

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. In some embodiments, the systems and methods described herein may be performed on a single device such as device 105. In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include a data management module 130. In one example, the device 105 may be coupled to storage device 110. In some embodiments, device 105 and storage device 110 may be components of flash memory or solid state drive. Alternatively, device 105 may be a component of a host of the storage device 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage device 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Data management module 130 may be configured to encrypt system level data structures to improve data security and improve storage system efficiency. In one embodiment, system level data structures may include system data generated by the storage system and metadata generated by the storage system and/or a user of the storage system.

Figure 2:
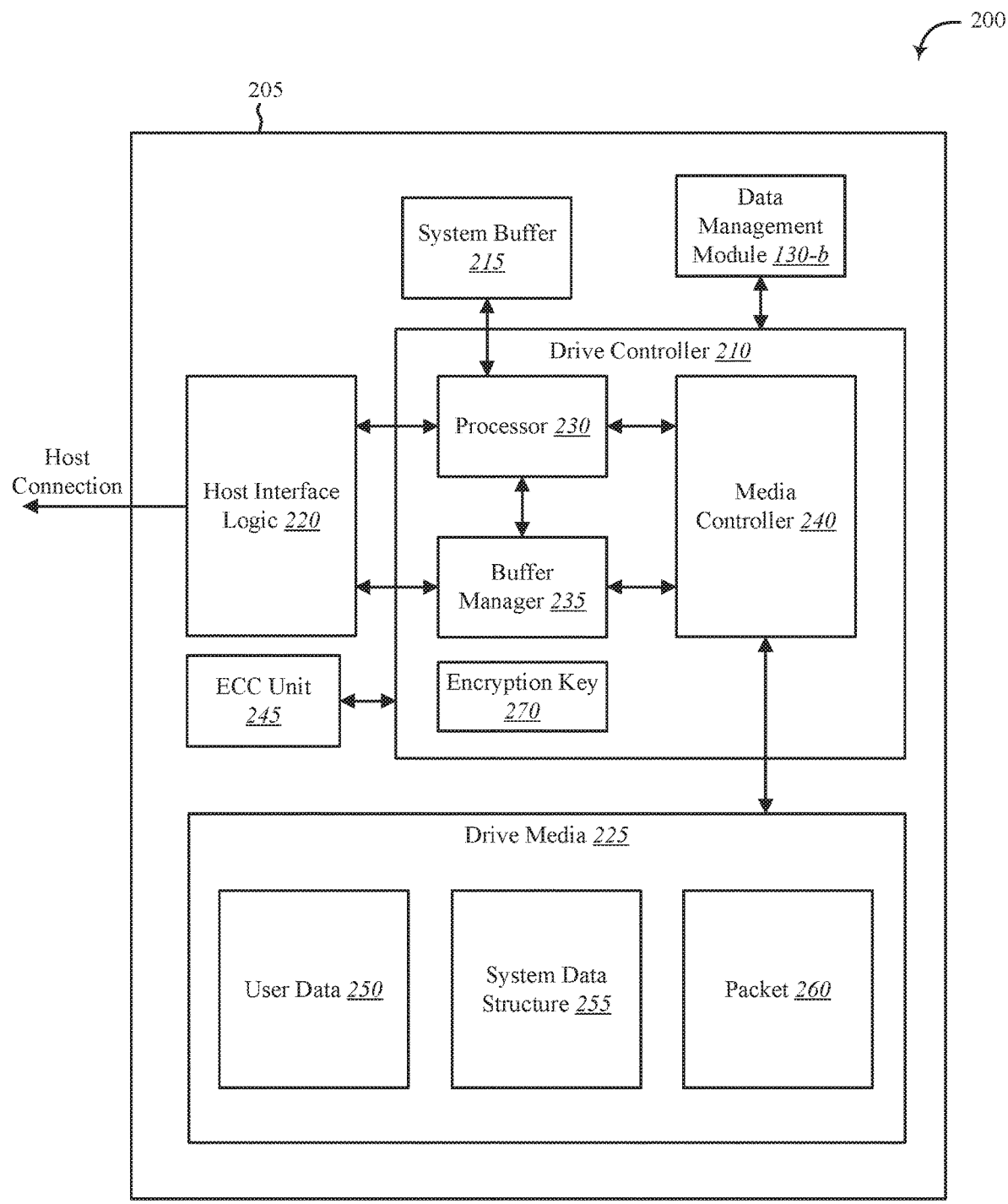
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, error correction code (ECC) unit 245, and data management module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, media controller 240, and one or more encryption keys 270. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in and/or being read from drive media 225.

Although depicted outside of drive controller 210, in some embodiments, data management module 130-a may include software, firmware, and/or hardware located within drive controller 210. For example, data management module 130-a may include at least a portions of processor 230, buffer manager 235, media controller 240, and/or the one or more encryption keys 270. In one example, data management module 130-a may include one or more instructions executed by processor 230, buffer manager 235, media controller 240, and/or the one or more encryption keys 270. The data management module 130-a may be configured to identify data received from a host of a storage drive and encrypt the received data using one or more encryption keys associated with apparatus 205 such as the one or more encryption keys 270, for example. In one embodiment, the one or more encryption keys 270 may be programmed into drive controller 210 by a manufacturer of apparatus 205 and/or an end user of apparatus 205.

As depicted, drive media 225 may include user data 250, system data structure 255, and packet 260. In one embodiment, data management module 130-a may be configured to encrypt user data 250 and store the encrypted user data 250 on drive media 225. In some embodiments, data management module 130-a may be configured to encrypt system data structure 255 and store the encrypted system data structure 255 on drive media 225. In some embodiments, data management module 130-a may be configured to store packetized user data on drive media 225. Accordingly, data management module 130-a may be configured to store an encrypted version of user data 250 in packet 260. Additionally, or alternatively, data management module 130-a may be configured to store an encrypted version of system data structure 255 in packet 260.

In one embodiment, the encryption and recovery of encrypted data may be performed by data management module 130-a. For example, data management module 130-a may decrypt encrypted user data stored in drive media 225 such as user data 250. After decrypting the user data, drive controller 210 may determine that the decrypted user data includes one or more errors. Accordingly, ECC unit 245 may perform one or more error correction operations to correct the errors in the decrypted user data.

Figure 3:
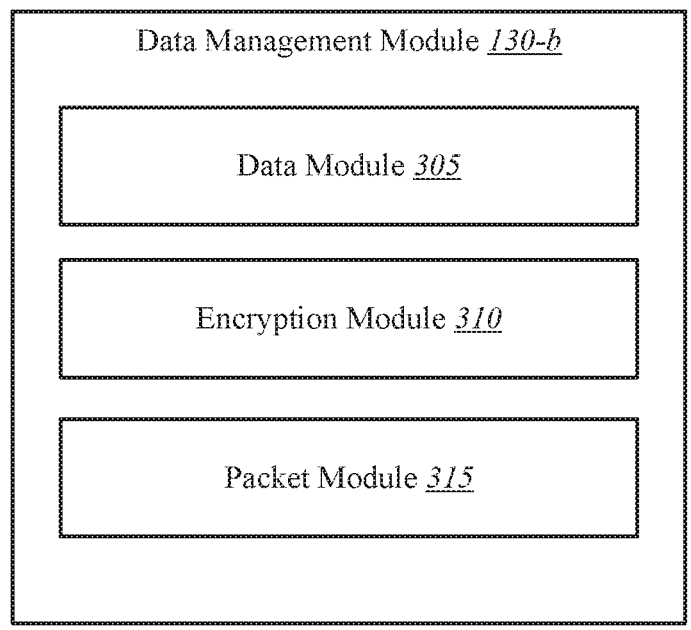
FIG. 3 shows a block diagram of one or more modules in accordance with various aspects of this disclosure.

FIG. 3 shows a block diagram of a data management module 130-b. The data management module 130-b may include one or more processors, memory, and/or one or more storage devices. The data management module 130-b may include data module 305, encryption module 310, and packet module 315. The data management module 130-b may be one example of data management module 130 of FIGS. 1 and/or 2. Each of these components may be in communication with each other. In some embodiments, data management module 130-b and/or modules of data management module 130-b may perform one or more operations in conjunction with a storage drive and/or a controller of the storage drive.

In one embodiment, data module 305 may be configured to identify user data assigned to be stored on the storage drive. For example, a host of a storage drive may provide data to the storage drive. Data module 305 may analyze the data to determine whether the data includes user data. In some cases, data module 305 may analyze the data to identify user data as well as system data structures, metadata and/or system data associated with the user data. In some embodiments, data module 305 may generate a system data structure, such as system data and/or metadata, upon identifying the user data received from the host.

In some embodiments, the system data structure may include at least one of metadata, system data, and data encapsulation relative to the user data. In some configurations, data module 305 may be configured to identify a system data structure generated in relation to user data. The system data structure may include any combination of system data and metadata. In one embodiment, system data may include data generated by a storage system in relation to one or more operations of the storage system involving the user data. In one embodiment, system data may be generated by a storage system while metadata may be generated by the storage system and/or a user of the storage system. For example, a storage system may generate system data in relation to a mapping between a host logical block address (LBA) for the user data and a physical location where the user data is stored on a storage medium of the storage system.

In some embodiments, data module 305 may be configured to generate metadata in relation to the user data. In some cases, the metadata may include data that describes the user data. In some embodiments, the metadata may be generated by the storage drive and/or a user of the storage drive. For example, a first metadata may include data generated by a storage drive, a second metadata may include data generated by a user of the storage drive, and a third metadata may include data generated by a storage drive and a user of the storage drive.

In some embodiments, encryption module 310 may be configured to encrypt user data. Additionally, or alternatively, encryption module 310 may be configured to encrypt a system data structure associated with the user data. In some embodiments, encryption module 310 may be configured to encrypt metadata with an encryption key used to encrypt the user data. In some cases, the encryption module may encrypt the metadata with an encryption key different from the one used to encrypt the user data.

In some embodiments, data module 305 may be configured to generate system data in relation to the user data. In some cases, the system data may include data generated to enable the storage drive to perform an operation. For example, system data may include data generated to enable the storage drive to perform an operation involving the user data such as determining where the user data is physically located on a storage drive, reading data from its physical location on the storage drive, determining an available physical location on a storage drive where data may be stored, writing data to the storage drive, or any combination thereof. In some cases, the system data may be generated by the storage drive. In some cases, the data module 305 may be configured to enable only the storage drive to generate system data, while enabling the storage drive and/or a user of the storage drive to generate metadata.

In some embodiments, encryption module 310 may be configured to encrypt the system data with an encryption key used to encrypt the user data. In some cases, the encryption module may encrypt the system data with an encryption key different from the one used to encrypt the user data. In some cases, the user data and/or the system data structure may be encrypted with an encryption key programmed on the storage drive. In some embodiments, the user data and/or the system data structure may be encrypted with an encryption key provided by the host. For example, in one embodiment, the encryption key used by the encryption module 310 to encrypt the user data may be sent with the user data.

In some embodiments, packet module 315 may be configured to generate a packet to encapsulate the user data. In some embodiments, packet module 315 may be configured to put the encrypted user data in a payload area of the packet. In some embodiments, data module 305 may be configured to identify header data associated with at least one of the user data and the packet. In some cases, the system data structure may include the header data associated with the user data and/or packet. In some embodiments, encryption module 310 may be configured to encrypt the header data with an encryption key used to encrypt the user data. In some cases, the encryption module may encrypt the header data with an encryption key different from the one used to encrypt the user data. In some embodiments, packet module 315 may be configured to put the encrypted header data in a header area of the packet.

Figure 4:
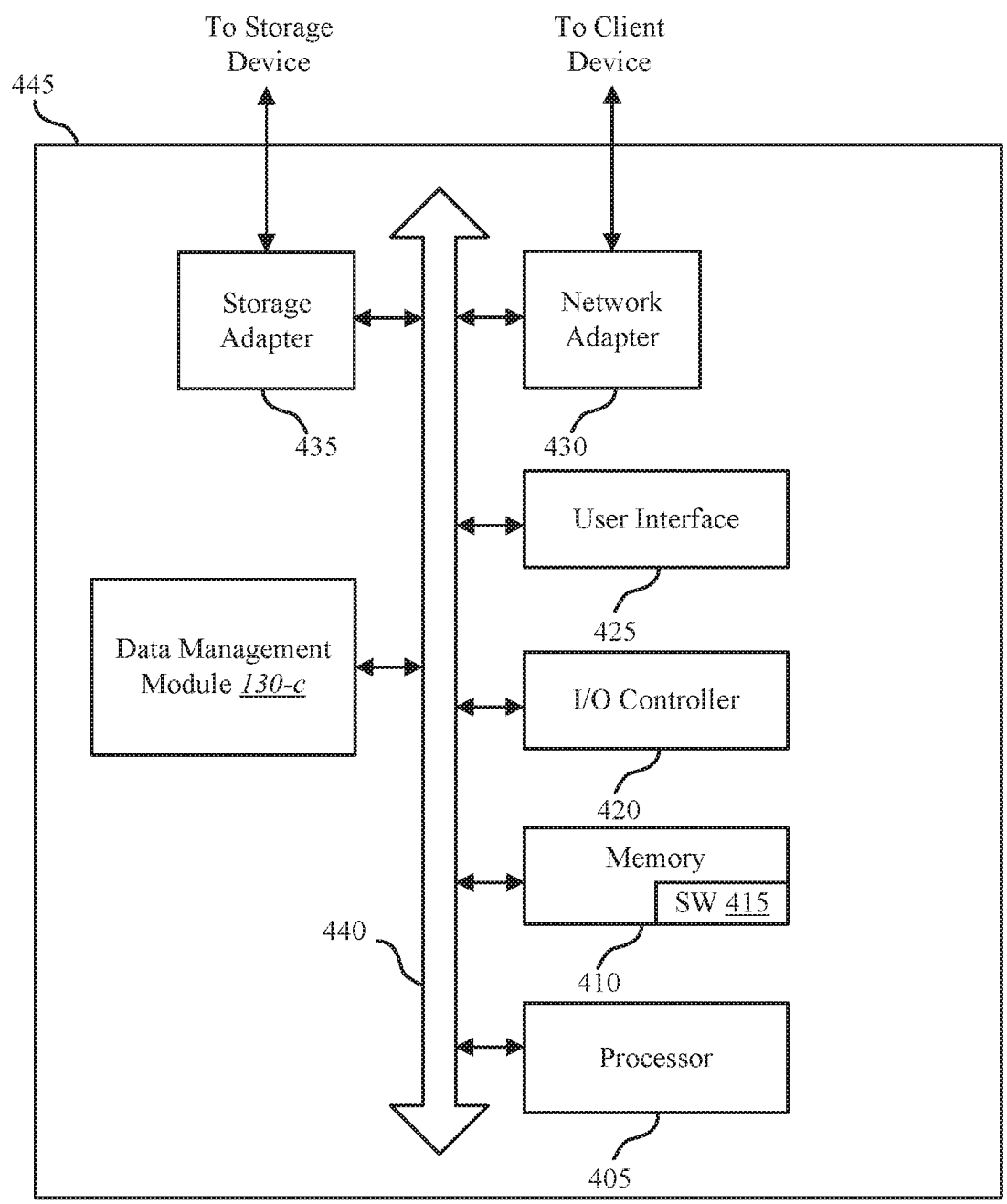
FIG. 4 shows a diagram of a system in accordance with various aspects of this disclosure.

FIG. 4 shows a system 400 for encrypting system level data structures, in accordance with various examples. System 400 may include an apparatus 445, which may be an example of any one of device 105 of FIG. 1 and/or device 205 of FIG. 2.

Apparatus 445 may include components for bi-directional voice and/or data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a data management module 130-c, which may perform the functions described above for the data management module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), or any combination thereof.

In some embodiments, the memory 410 may contain, among other things, the Basic Input-Output system (BIOS) which may control basic hardware and/or software operation such as the interaction with peripheral components or devices. For example, at least a portion of the data management module 130-c may be stored within the system memory 410 to implement the present systems and methods. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to one or may be included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a network associated with device 105, as on example. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
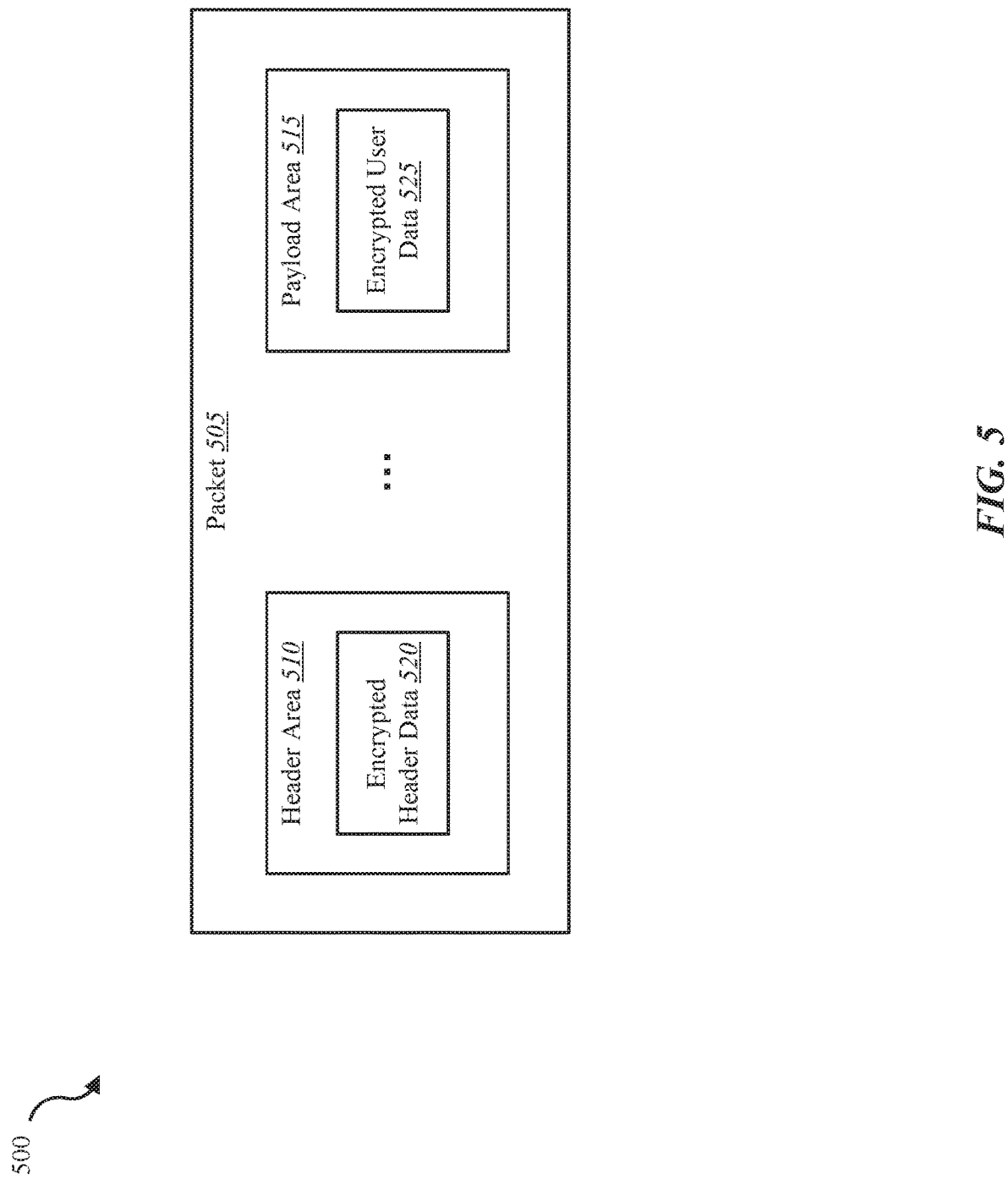
FIG. 5 shows one embodiment of an environment in accordance with various aspects of this disclosure.

FIG. 5 shows an environment 500 for encrypting system level data structures, in accordance with various examples. At least one aspect of environment 500 may be implemented in conjunction with device 105 of FIG. 1, apparatus 205 of FIG. 2, and/or data management module 130 depicted in FIGS. 1, 2, 3, and/or 4. In one embodiment, environment 500 may include a storage system configured for storing user data and/or system data.

As depicted, environment 500 may include packet 505. Packet 505 may be one example of packet 260 of FIG. 2. As shown, packet 505 may include header area 510 and payload area 515. In some cases, packet 505 may include additional areas or fields before header area 510, between header area 510 and payload area 515, and/or after payload area 515. In one embodiment, packet module 315 (FIG. 3) may generate packet 505. In some embodiments, data module 305 may receive data from a host of a storage drive. Data module 305 may identify user data in the received data. In some embodiments, data module 305 may identify header data in relation to identifying the user data. For example, at least a portion of header data may be included in the data received from the host. In some cases, data module 305 may generate header data based at least in part on identifying user data. In some configurations, data module 305 may generate header data in relation to packet module 315 generating packet 505.

In some embodiments, encryption module 310 may encrypt the user data from the host of the storage drive to generate encrypted user data 525. In some cases, encryption module 310 may encrypt the header data to generate encrypted header data 520. In some embodiments, encryption module 310 may use the same encryption key to encrypt the user data and the header data. Alternatively, in some embodiments, encryption module 310 may use a first encryption key to encrypt the user data and a second encryption key different from the first encryption key to encrypt the header data. In some embodiments, packet module 305 may place encrypted user data 520 in the payload area 515 of packet 505. Additionally, packet module 315 may place encrypted header data 525 in the header area 510 of packet 505. A conventional packet of data may include encrypted user data and the rest of the data such as header data, etc., may remain unencrypted, but then the entire packet may be encrypted once all the data is added to the packet. Conversely, encryption module 310 may encrypt the user data and at least a portion of all other data added to packet 505 and then encryption module 310 may bypass and/or block encrypting the entire packet 505 after completing packet 505, or after packet module 315 finalizes packet 505, which may include adding to packet 505 all the data intended for packet 505.

Figure 6:
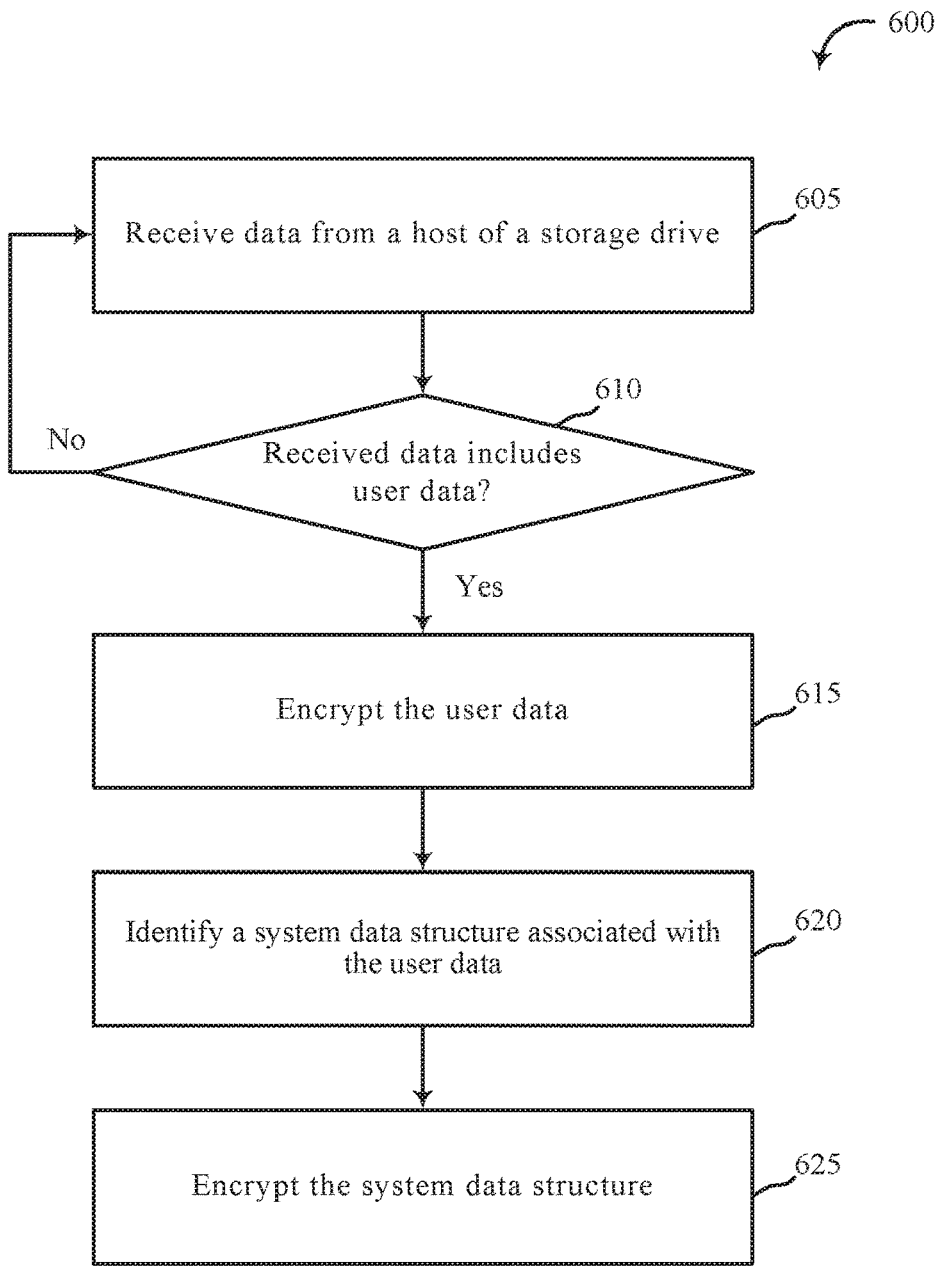
FIG. 6 is a flow chart illustrating an example of a method in accordance with various aspects of this disclosure.

FIG. 6 is a flow chart illustrating an example of a method 600 for encrypting system level data structures, in accordance with various aspects of the present disclosure. One or more aspects of the method 600 may be implemented in conjunction with device 105 of FIG. 1, apparatus 205 of FIG. 2, and/or data management module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include receiving data from a host of a storage drive. In some cases, the data may be sent by the host to be stored on the storage drive. In some configurations, the host of the storage drive may include an operating system and/or one or more hardware components of a computer system associated with the storage drive. At block 610, the method 600 may include determining whether the received data includes user data. Upon determining the received data does not include user data, method 600 may continue monitoring for received data at block 605. In some cases, the method 600 may include determining whether the received data includes a system data structure associated with the user data.

At block 615, the method 600 may include encrypting the user data upon determining the received data includes user data. In some cases, the encrypted user data may be encapsulated in a data packet. At block 620, the method 600 may include identifying a system data structure associated with the user data. At block 625, the method 600 may include encrypting the system data structure separately from encrypting the user data. In some cases, the encrypted system data structure may be added to the data packet with the encrypted user data. In some embodiments, the method 600 may bypass encrypting the entire data packet based at least in part on the user data and system data structure being encrypted before being encapsulated in the data packet.

The operation(s) at block 605-625 may be performed using the data management module 130 described with reference to FIGS. 1-4 and/or another module. Thus, the method 600 may provide for encrypting system level data structures relating to encrypting system level data structures. It should be noted that the method 600 is just one implementation and that the operations of the method 600 may be rearranged, omitted, and/or otherwise modified such that other implementations are possible and contemplated.

Figure 7:
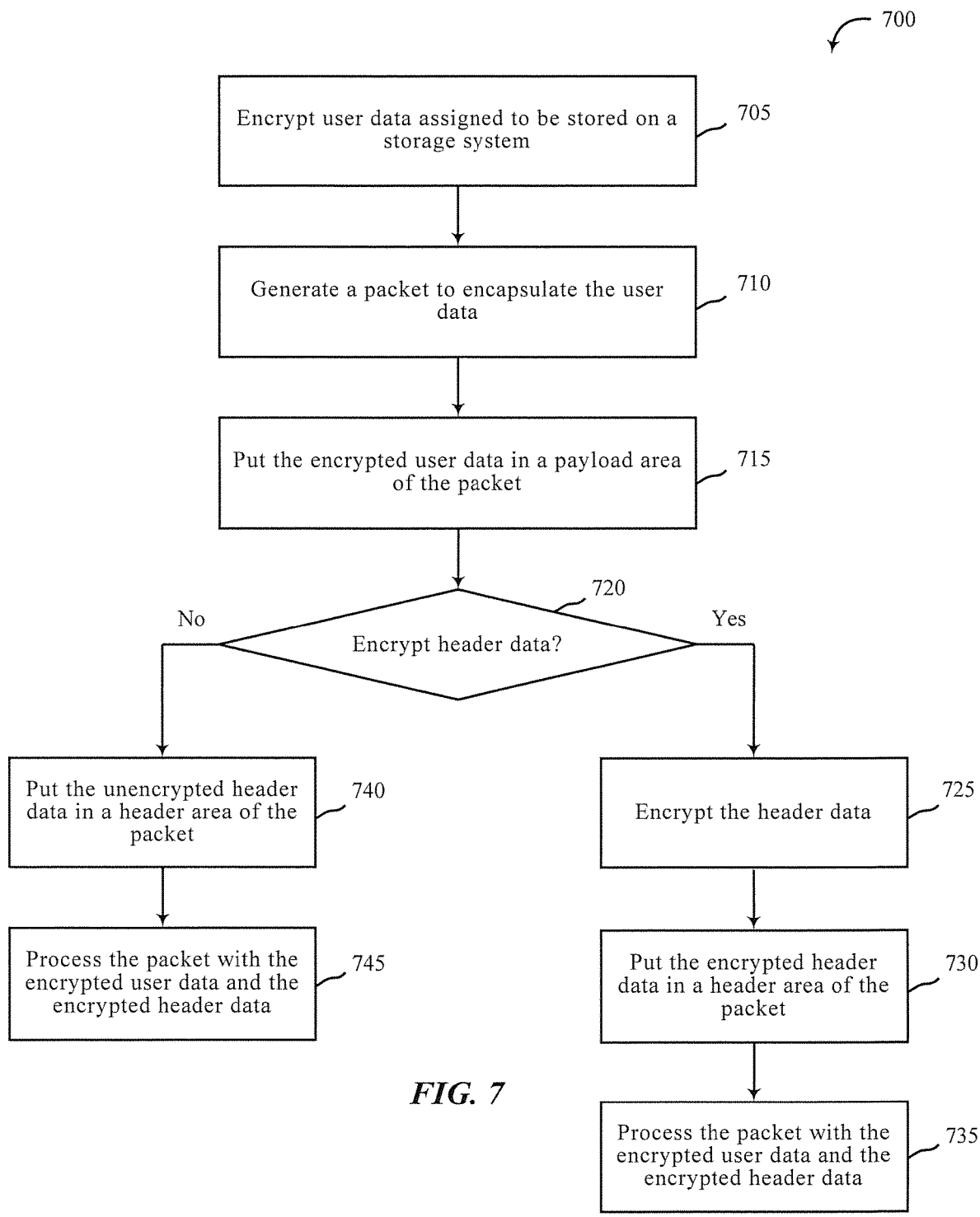
FIG. 7 is a flow chart illustrating an example of a method in accordance with various aspects of this disclosure.

FIG. 7 is a flow chart illustrating an example of a method 700 for encrypting system level data structures, in accordance with various aspects of the present disclosure. One or more aspects of the method 700 may be implemented in conjunction with device 105 of FIG. 1, apparatus 205 of FIG. 2, and/or data management module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, the method 700 may include encrypting user data assigned to be stored on a storage system. At block 710, the method 700 may include generating a packet to encapsulate the user data. At block 715, the method 700 may include putting the encrypted user data in a payload area of the packet. At block 720, the method 700 may include determining whether to encrypt header data generated in relation to the user data. In some cases, the header data may be associated with at least one of the user data and the packet generated to encapsulate the user data.

Upon determining to encrypt the header data, the method 700 may include encrypting the header data as indicated at block 725. In some cases, the header data may be encrypted with an encryption key used to encrypt the user data. At block 730, the method 700 may include putting the encrypted header data in a header area of the packet. At block 735, the method 700 may include processing the packet with the encrypted user data and encrypted header data. Upon determining to not encrypt header data, the method 700 may include putting the unencrypted header data in a header area of the packet as indicated at block 740. At block 745, the method 700 may include processing the packet with the encrypted user data and unencrypted header data. In some embodiments, processing the packet may include storing the packet on a storage medium of a storage system and/or sending packet to a remote storage system.

The operations at blocks 705-745 may be performed using the data management module 130 described with reference to FIGS. 1-4 and/or another module. Thus, the method 700 may provide for encrypting system level data structures relating to encrypting system level data structures. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
   a storage drive; and
   a controller of the storage drive to:
      receive, from a host computing device connected to the storage drive, user data assigned to be stored on the storage drive;
      generate, by the storage drive, a data structure based on the user data, the data structure describing the user data and enabling the user data to be written to the storage drive, the data structure relating to a mapping between a host logical block address for the user data and a physical location where the user data is stored on the storage drive;
      encrypt the user data with a first encryption key;
      encrypt the data structure with a second encryption key, the first encryption key differing from the first encryption key;
      encapsulate the encrypted user data and the encrypted data structure in a packet: and
      store the packet in the storage drive without the packet being encrypted as a whole.

2. The storage system of claim 1, the data structure comprising at least one of metadata, system data, and data encapsulation relative to the user data.

3. The storage system of claim 1, comprising the controller to:
   put the encrypted user data in a payload area of the packet.

4. The storage system of claim 1, comprising the controller to:
   identify header data associated with at least one of the user data and the packet.

5. The storage system of claim 4, comprising the controller to:
   encrypt the header data with the second encryption key.

6. The storage system of claim 5, comprising the controller to:
   put the encrypted header data in a header area of the packet.

7. The storage system of claim 1, comprising the controller to:
   generate metadata in relation to the user data, the metadata comprising data that describes the user data, the metadata being generated by at least one of the storage drive and a user of the storage drive; and
   encrypt the metadata with the first encryption key used to encrypt the user data.

8. The storage system of claim 1, comprising the controller to:
   encrypt the data structure with the first encryption key used to encrypt the user data prior to encrypting the data structure with the second encryption key.

9. The storage system of claim 1, the first encryption key programmed on the storage drive.

10. An apparatus comprising:
    a data management module of a data storage device comprising a drive controller and data storage media to:
       receive, from a host computing device connected to the data management module, user data assigned to be stored on a memory of the data storage device;
       generate a data structure based on the user data, the data structure describing the user data and enabling the user data to be written to the data storage media, the data structure relating to a mapping between a host logical block address for the user data and a physical location where the user data is stored on the storage drive;
       encrypt the user data with a first encryption key;
       encrypt the data structure with a second encryption key, the first encryption key differing from the first encryption key;
       encapsulate the encrypted user data and the encrypted data structure in a packet;
       process the packet without the packet being encrypted as a whole; and
       storing the packet in the data storage media with the user data and data structure each respectively encrypted.

11. The apparatus of claim 10, the data structure comprising at least one of metadata, system data, and data encapsulation relative to the user data.

12. The apparatus of claim 10, comprising the data management module to:
    put the encrypted user data in a payload area of the packet.

13. The apparatus of claim 10, comprising the data management module to:
    identify header data associated with at least one of the user data and the packet.

14. The apparatus of claim 13, comprising the data management module to:
    encrypt the header data with the second encryption key.

15. The apparatus of claim 14, comprising the data management module to:
    put the encrypted header data in a header area of the packet.

16. The apparatus of claim 10, comprising the data management module to:
    generate metadata in relation to the user data, the metadata comprising data that describes the user data, the metadata being generated by at least one of the apparatus and a user of the apparatus; and
    encrypt the metadata with the first encryption key used to encrypt the user data.

17. A method comprising:
    receiving, at a storage drive from a host computing device connected to the storage drive, user data assigned to be stored on the storage drive;
    generating, by the storage drive, a data structure based on the user data, the data structure describing the user data and enabling the user data to be written to the storage drive the data structure relating to a mapping between a host logical block address for the user data and a physical location where the user data is stored on the storage drive;

encrypting the user data with a first encryption key;

encrypting the data structure with a second encryption key, the first encryption key differing from the second encryption key;

encapsulating the encrypted user data and the encrypted data structure in a packet; and storing the packet in the storage drive without the packet being encrypted as a whole.

18. The method of claim 17, comprising:

putting the encrypted user data in a payload area of the packet;

identifying header data associated with at least one of the user data and the packet; and putting the encrypted header data in a header area of the packet.

\* \* \* \* \*